Patented Mar. 24, 1925.

1,530,542

UNITED STATES PATENT OFFICE.

WILLIS H. CARRIER, OF ESSEX FELLS, NEW JERSEY, ASSIGNOR TO CARRIER ENGINEERING CORPORATION, OF NEWARK, NEW JERSEY.

SUBSTANCE AND PROCESS OF USING THE SAME FOR REFRIGERATING PURPOSES.

No Drawing.    Application filed February 2, 1924.    Serial No. 690,301.

*To all whom it may concern:*

Be it known that I, WILLIS H. CARRIER, a citizen of the United States, residing at Essex Fells, in the county of Essex and State of New Jersey, have invented a new and useful Improvement in Substances and Processes of Using the Same for Refrigerating Purposes, of which the following is a specification.

My invention relates to a substance and a process of using the same in refrigeration, whether for making ice, for cold storage work, for cooling water for use in conditioning air, or for other cooling purposes.

The substance known as dichloroethylene and having the formula $C_2H_2Cl_2$ has certain properties or characteristics which are ideal in a refrigerating medium. It has a boiling point of approximately 55° C.; it is inactive towards common metals at any temperature, either in the liquid or gaseous state, or in the presence of water; it does not volatilize appreciably at ordinary atmospheric temperatures; it will not freeze at any temperature which will be encountered. The gas is dense, being several times heavier than air and does not readily diffuse or spread, thus permitting the refrigerating apparatus to be opened up at any time without removing the liquid and without objection from fumes; the liquid will not explode or readily burn and it can be handled like water in open containers with entire safety.

I have found, however, that the commercial dichloroethylene, which has been used for refrigeration, has the objection that its boiling point is variable. The boiling point increases as the liquid is evaporated so that purging in the refrigerant and constant reduction of volume of the liquid causes a continually rising boiling point, and also causes an appreciable difference between the boiling point and the condensing point, thereby reducing the efficiency of the refrigerating machine. The reason for this is that normal commercial dichloroethylene contains two isomers; one, trans-isomer, having a boiling point of approximately 49° C., and the other, cis-isomer, having a boiling point of approximately 60° C. The proportion of these isomers is approximately 25 percent or 30 percent trans-isomer to 75 percent or 70 percent cis-isomer. The respective vapor pressures of these two isomers at the same temperature is about in the proportion of 1 to .54, thus in a normal mixture of the saturated vapors of the different isomers, about 65 percent will be of a trans-isomer and 35 percent will be of a cis-isomer.

This objection I have succeeded in overcoming by refining or modifying, (chiefly by means of fractional distillation) commercial dichloroethylene, so as to secure a dichloroethylene in which the proportions of the trans- and cis-isomers are reversed, that is to say, having approximately 65 percent of trans-isomer and 35 percent of cis-isomer. I have discovered by practical use that this compound has a substantially constant boiling point regardless of the quantity evaporated, for the reason that the ratio of trans- and cis-isomer vapors given off is substantially the same as their constituent proportions in the liquid, and furthermore, that the boiling point of the same and the condensing point of the resultant vapor are always in agreement, making the use of this new substance practicable for commercial refrigeration.

In my process of refrigeration, using this new refrigerating medium, the refrigerant liquid is evaporated, preferably by the heat abstracted from the water or other medium or enclosure being cooled, and the refrigerant vapor is compressed and condensed, the liquefied and cooled refrigerant being returned to be again evaporated, this cycle of operations being continuous. Preferably, a centrifugal compressor is used which produces only a moderate difference in pressure, and the refrigerant is condensed as well as evaporated at a pressure below one atmosphere so that the entire system is under a partial vacuum. All liquefied refrigerant is immediately transferred as formed from the condenser to the evaporator, and any surplus liquid is maintained in the evaporator. Simultaneously with the return of the liquefied refrigerant from the condenser, the residual dense refrigerant vapor, together with any non-condensible gas or air that may be present are withdrawn from the condenser, and after compressing and condensing the vapor to separate it from the non-condensable gas, the condensate is returned to the evaporator at the temperature level of the evaporator. This enables the boiling point in the evaporator and the condensing point in the condenser to be maintained more nearly the same, since if the liquid is allowed to collect in the condenser, there would be an accumulation of the less volatile portion in the condenser while the more volatile portion would be removed.

I claim as my invention:

1. A refrigerating medium consisting of dichloroethylene having the formula $C_2H_2Cl_2$ but having trans-isomers in greater proportion than cis-isomers.

2. A refrigerating medium composed of trans-isomer dichloroethylene and cis-isomer dichloroethylene in approximately the proportions of 65 percent of the former and 35 percent of the latter.

3. A refrigerating medium consisting of a mixture of the two isomers of dichloroethylene in approximately the same ratio as their vapor pressures at the evaporating temperature.

4. A refrigerating process which comprises evaporating dichloroethylene having trans-isomers in greater proportion than cis-isomers, compressing and condensing the resultant vapor to liquefy the same and returning the liquefied dichloroethylene to be again vaporized.

5. A refrigerating process which comprises evaporating a refrigerating medium composed of trans-isomer dichloroethylene and cis-isomer dichloroethylene in approximately the proportions of 65 percent of the former and 35 percent of the latter, compressing and condensing the resultant vapor to liquefy the same, and returning the liquefied refrigerating medium to be again vaporized.

WILLIS H. CARRIER.